Feb. 13, 1962 E. BEYER 3,021,395

MAGNETIC RECORDING APPARATUS WITH CORRECTION DEVICE

Filed Dec. 23, 1958 5 Sheets-Sheet 1

INVENTOR.
EUGEN BEYER
BY
MICHAEL S. STRIKER
ATTORNEY

Feb. 13, 1962 E. BEYER 3,021,395

MAGNETIC RECORDING APPARATUS WITH CORRECTION DEVICE

Filed Dec. 23, 1958 5 Sheets-Sheet 2

INVENTOR.
EUGEN BEYER
BY MICHAEL S. STRIKER
ATTORNEY

INVENTOR.

EUGEN BEYER

BY

MICHAEL S. STRIKER

ATTORNEY

Feb. 13, 1962 E. BEYER 3,021,395

MAGNETIC RECORDING APPARATUS WITH CORRECTION DEVICE

Filed Dec. 23, 1958 5 Sheets-Sheet 4

INVENTOR.
EUGEN BEYER
BY
MICHAEL S STRIKER
ATTORNEY

INVENTOR.
EUGEN BEYER
BY
MICHAEL S. STRIKER
ATTORNEY

3,021,395
MAGNETIC RECORDING APPARATUS WITH CORRECTION DEVICE

Eugen Beyer, 107 Bismarckstrasse, Heilbronn (Neckar), Germany

Filed Dec. 23, 1958, Ser. No. 782,548
3 Claims. (Cl. 179—100.2)

The present invention concerns apparatus for magnetically recording signals on a record carrier and for electromagnetically reproducing the recorded signals therefrom. The method and apparatus according to the invention are particularly advantageous in those cases where the apparatus contains only one single electromagnetic recording and pick-up device responsive to electrical signals and capable both of causing magnetization of the record carrier in accordance with such signals, and of being influenced by such magnetization of the record carrier in accordance with such signals for reproducing the latter.

Particularly in the use of magnetic recording apparatus for recording dictation and reproducing the same it is frequently necessary that single words or passages are corrected or erased. The correction is mostly carried out in such a manner that a new recording is effected on that portion of the tape or other record carrier which carries that passage which has to be corrected. By doing this, the previously recorded message or word is automatically erased, particularly if the proper degree of high frequency premagnetization is used. However, difficulties arise every time when for instance the new words or passages are shorter than the ones to be replaced. Then it is necessary to erase additionally that portion of the first recording which is not replaced by the shorter new recording because otherwise during the subsequent reproduction the typist will obtain a confused and incorrect dictation.

If the apparatus is equipped with separate reproducing and erasing heads then the difficulty can be overcome by switching the apparatus to reproduction and simultaneously causing the eraser head which is arranged beyond the pick-up head, to wholly or partly erase that portion of the record which the operator is listening to.

However, if the apparatus is equipped only with one single magnetic head for recording and reproducing then it is not possible to operate in this manner for the simple reason that there does not exist a separate eraser head.

It is therefore a main object of the present invention to provide in an apparatus for magnetically recording signals on a record carrier and for electromagnetically reproducing signals therefrom, means for electromagnetically at least partly erasing the recorded signals.

It is a further object of this invention to provide an apparatus of the type set forth which is simple in construction and reliable in operation.

With above objects in mind the present invention essentially consists in providing in an apparatus for magnetically recording signals on a record carrier and for electromagnetically reproducing the recorded signals therefrom, in combination, an electromagnetic recording and pick-up device including one single magnet and coil means responsive to electrical signals and capable both of causing magnetization of said record carrier in accordance with said signals, and of being influenced by such magnetization of said record carrier in accordance with said signals for reproducing the latter; reproducing amplifier means comprising input transformer means having a primary and a secondary winding, said primary winding being connected in circuit with said coil means; means including a source of high frequency for electromagnetically at least partly removing said magnetization of said record carrier by applying to said coil means a demagnetizing high frequency current from said source of a frequency substantially higher than audio frequency substantially in that portion of said record carrier by which said electromagnetic recording and pick-up device is being influenced during reproduction of the particular signals; and low-pass filter means connected between said coil means and said primary winding for blocking the passage of said high frequency current from said coil means to said primary winding.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
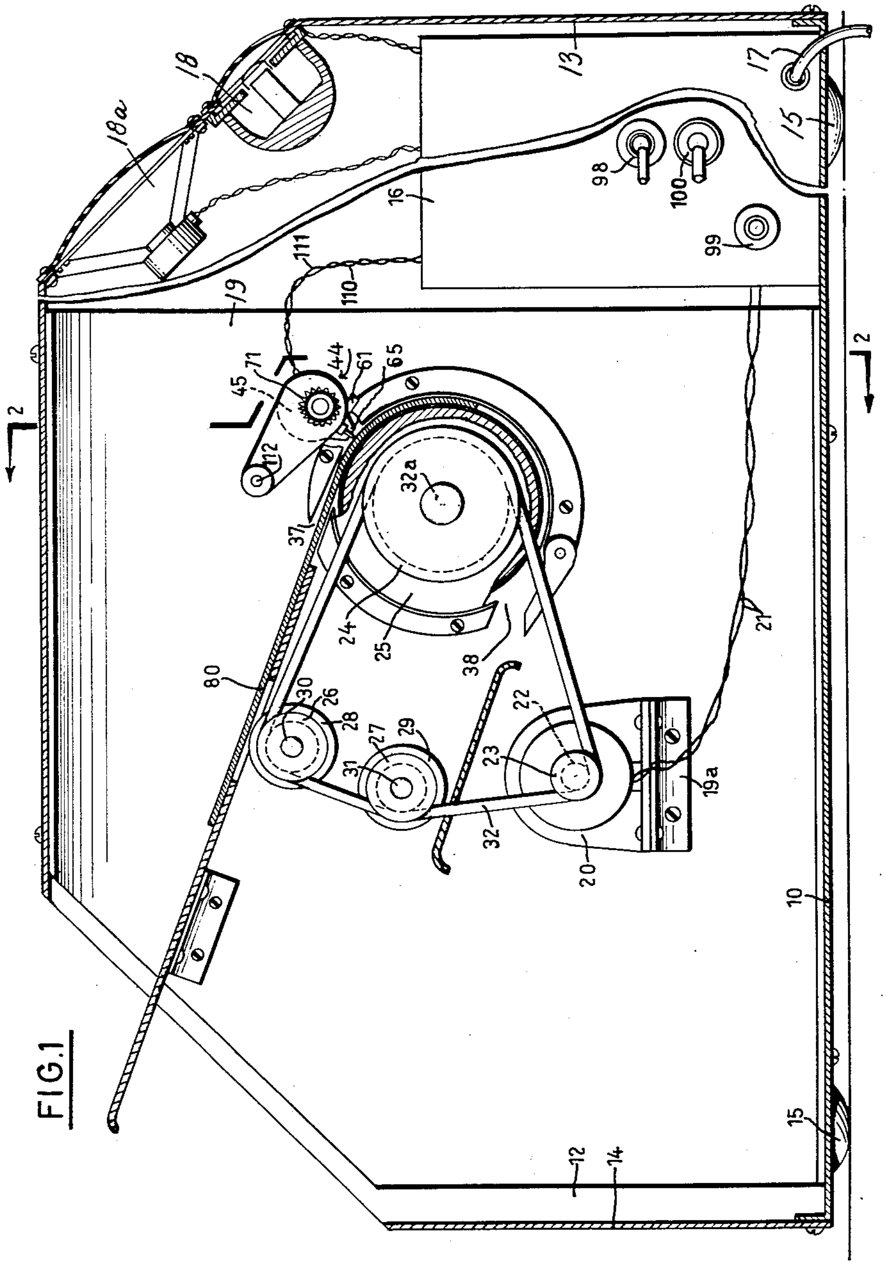
FIG. 1 is a sectional diagrammatic elevation of the whole recording and reproducing apparatus.
Figure 2:
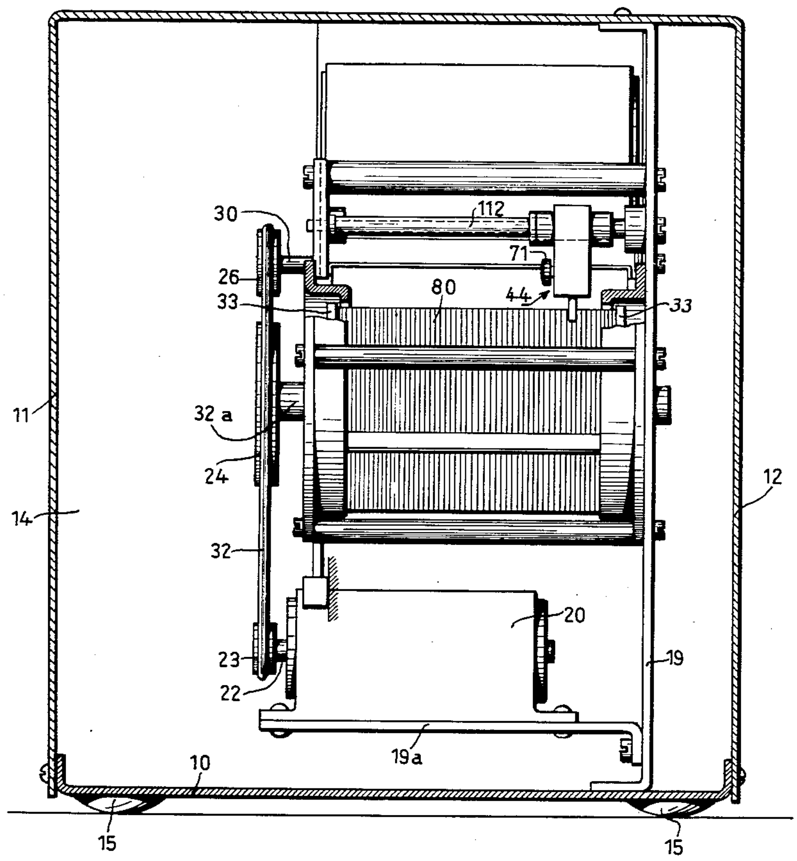
FIG. 2 is a sectional end view, the section being taken along line 2—2 of FIGURE 1.

Referring first to FIGS. 1 and 2, the apparatus according to the invention is shown as having a housing including a bottom portion 10, side walls 11 and 12, a front wall 13 and a rear wall 14, the whole housing being supported by legs 15. Mounted adjacent to the front wall 13 is a power supply unit 16, hereafter called "main amplifier" which is supplied via a cable 17 with line voltage. The front wall 13 further carries a microphone 18 and a loud speaker 18*a*. Since the main amplifier does not constitute any part of the present invention no further details thereof need be described. Mounted on the cover plate of the main amplifier 16, as shown in FIG. 1, are a change-over switch 98 for controlling recording and reproduction, an on-and-off switch 100 for the power supply and a push button switch 99 for controlling the erasure procedure. The function of the switches will be described further below.

Inside the housing is a mounting wall 19 carrying a bracket 19*a* on which a motor 20 is mounted that is connected to a source of electrical energy by means of the conductors 21. A pulley 23 is mounted on the motor shaft and serves to drive, via intermediate pulleys 26 and 27 carried by rollers 28 and 29 respectively rotatable about stationary pivot pins 30 and 31, a main pulley 24 through a belt or cord 32. The main pulley 24 is attached to a drum 25 which is designed to support the record carrier or foil 80.

The drum 25 is rotatable together with the main pulley 24 about a pivot 32*a* stationarily mounted on the wall 19. As can be seen in FIGURE 2 wherein the drum 25 is covered by the record carrier 80, the drum 25 is provided with end flanges 33 which serve to hold the record carrier 80 in proper axial alignment. The record carrier 80 is in this example a suitable foil of predetermined width and length.

The carrier arm 44 includes the magnetic head 45 which serves as recording, reproducing and erasing head and is urged by means not shown toward the drum 25 so that the magnetic head 45 is also kept in a position close to the drum or rather to the record carrier 80 located on the drum. The magnetic head 45 is connected by conductors 110 and 111 with the main amplifier 16. The arm 44 is supported on a rod 112 attached to the wall 19 in such a manner that the arm 44 can swing about the axis of the rod 112 and also slide along the latter.

Figure 4:
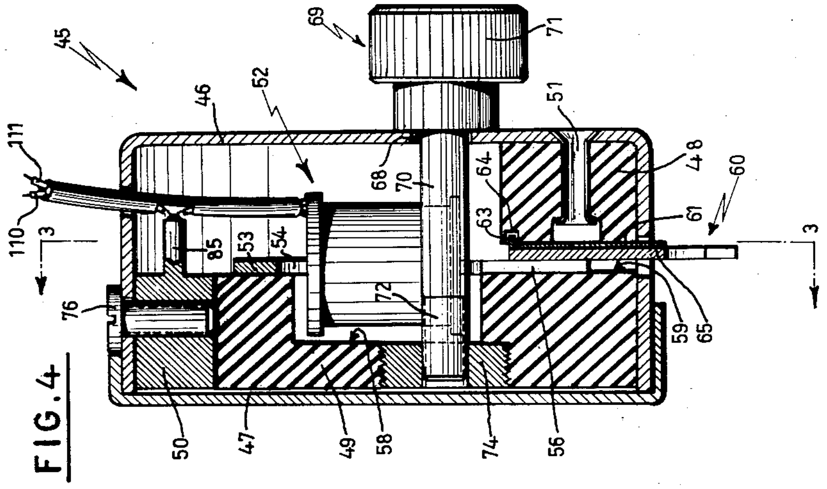
FIG. 4 is a corresponding cross sectional end view of the magnetic head shown in FIGURE 3, the section being taken along line 4—4 of FIGURE 3.
Figure 3:
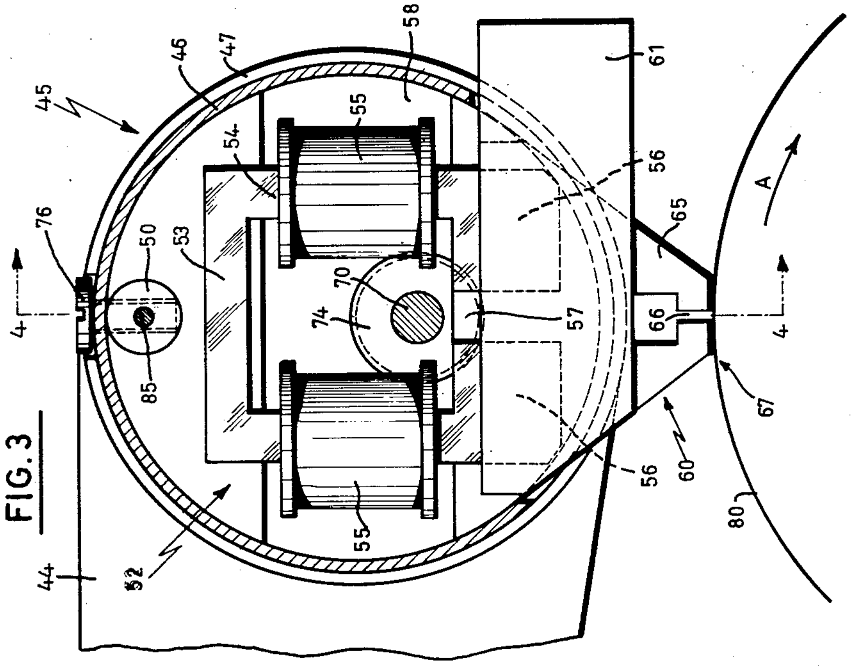
FIG. 3 is a partly sectional front view of the magnetic head of the apparatus shown at a larger scale, the section being taken along line 3—3 of FIGURE 4.

Referring now to FIGS. 3 and 4, the magnetic head 45 is provided with a substantially circular housing mounted in the free end of the arm 44 and has a front portion 46 and an overlapping rear portion 47, both portions being made of a metal which is capable of acting as a magnetic shield. Mounted within the front portion 46 are two filler pieces 48 and 49 made of insulating material. The piece 48 is attached to the front wall of the portion 46 by means of a hollow rivet 51. The filler piece 49 carries a metal insert 50 which in turn carries a contact pin 85 projecting to the right as seen in FIG. 4. The purpose of this pin 85 will be described further below.

At the top of the head 45 a screw 76 is arranged so as to penetrate through both housing portions 46 and 47 and is screwed into the metal insert 50, the arrangement being such that the top surface of the screw head is flush with the overlapping marginal portion of the rear housing portion 47. The screw 76 and the metal insert 50 serve not only to hold the above mentioned parts in their relative positions of assembly but also to establish an electrically conductive connection of pin 85 with the housing portions 46 and 47.

The filler piece 49 is provided with a U-shaped recess 58 which will be referred to further below. Adjacent to the front face 59, facing to the right in FIG. 4, of the filler piece 49 a magnet yoke 53 forming part of an electromagnet 52 is mounted in such a manner that its vertical legs 54 carrying each a coil 55 hold these coils in a position in which they project into the recess 58. The coils 55 are connected in series and may have an inductance of for instance 50 mh. Of the above mentioned conductors 110, 111 which connect the coils 55 with the power supply unit or main amplifier 16, the wire 110 is tapped and connected to the pin 85 so as to connect one end of the coils 55 via the metal insert 50 with electrical ground. The legs 54 of the above mentioned magnetic yoke have at their lower ends lateral portions 56 which project toward each other but do not touch each other so that a gap 57 is left. A sensing member 60 is inserted between the projecting portions 56 and the filler piece 48. The sensing member 60 comprises a holding piece 61 which projects from the housing 46 and from the arm 44 and has at its upper end a lug 63 projecting into a recess 64 of the filler piece 48 so as to be guided therein (see FIG. 4). Attached to the rear face (left face as seen in FIG. 4) of the holding piece 61 is a sensing plate 65 which may be attached by adhesive, by soldering, by welding or any other suitable means so that the parts 61 and 65 constitute an integral unit. The sensing plate 65 is essentially of triangular shape pointing downwards with a blunted tip and is provided with a gap 66.

Somewhat underneath the center of the head 45 the front portion wall 46 is provided with a bore or opening 68 through which the shank 70 of a clamping screw 69 may be introduced. The screw 69 has at its outer end a knurled head 71 and at its other end a thread 72 by means of which it is screwed into a nut 74 inserted at the rear side of the filler piece 49. It can be seen that by tightening the screw 69 the lower part of the filler piece 49 is pressed against the yoke portions 56, and thereby against the sensing plate 65 and the holding piece 61 so that the latter pieces are pressed against the filler piece 48. By such clamping pressure the whole sensing member 60 is held in proper position and a reliable magnetic connection between the sensing plate 65 and the portions 56 of the yoke 53 is established.

Figure 5:
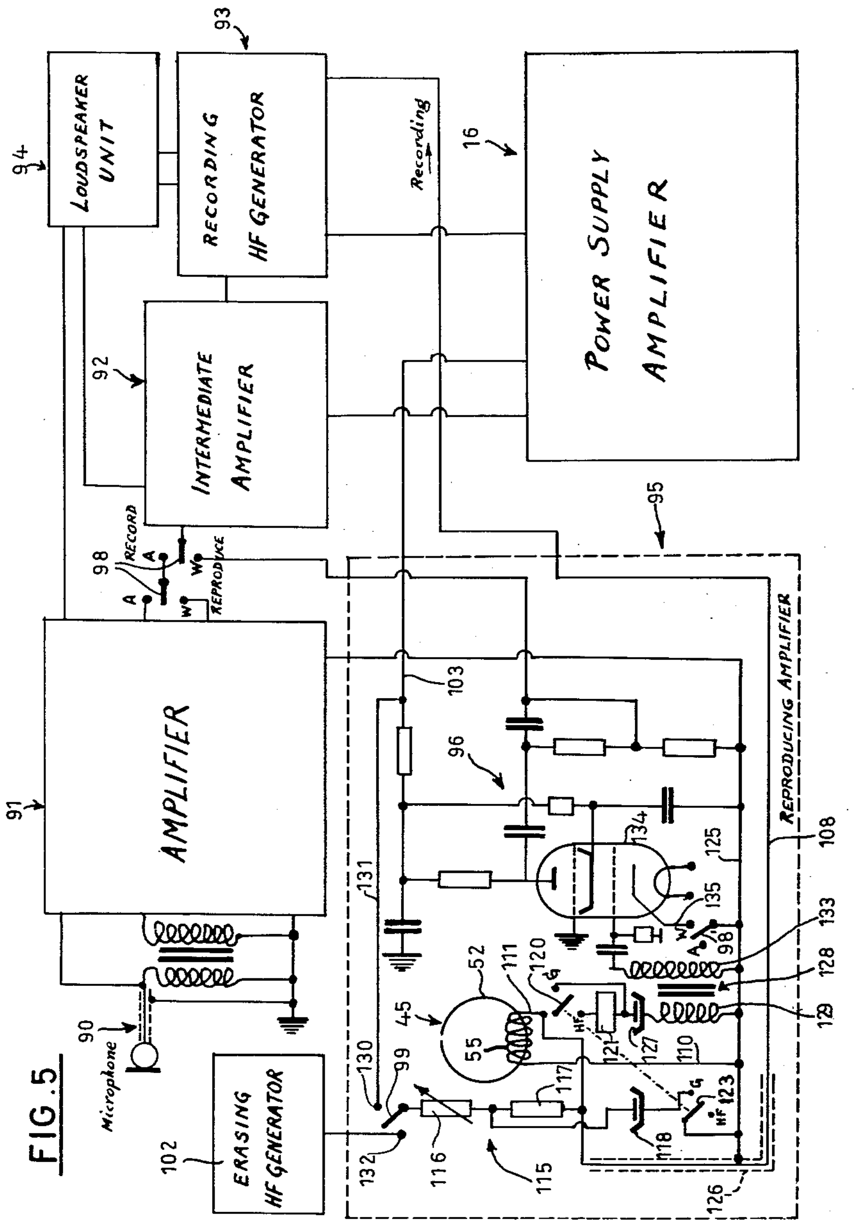
FIG. 5 is a schematic wiring diagram of the whole apparatus.

Referring now to the wiring diagram of FIG. 5, which shows the connections and circuits for a single magnetic head 45 for the purposes of recording, reproducing and erasing signals carried by the record carrier of a magnetic recording and reproducing apparatus, the conventional amplifier unit, HF generator units and the power supply or main amplifier unit are shown in the form of block diagrams only. FIGURE 5 shows in the diagram a microphone circuit 90 connected with an input amplifier 91 which can be connected with an intermediate amplifier stage 92 as will be explained later. A high frequency generator 93 and a loud speaker unit 94 are shown connected with the above mentioned components. The main amplifier is again identified by 16. The magnetic head 45 is shown within the reproducing amplifier unit 95 together with a reproducing amplifier circuit 96. The unit 93 functions during recording as a HF generator and during reproduction as a LF end stage. A second HF generator 102 is provided for being used in the erasing operation as will be described further below.

The apparatus is switched between recording and reproducing conditions by means of the change-over switch 98 and the eraser switch 99 serves to apply direct current or HF current, for the purpose of erasing, to the magnetic head 45.

In the following paragraphs only those parts of the reproducing amplifier unit 95 will be described which are required for the erasing operation since the circuits for recording and reproducing are well known in the art.

As stated above, the magnetic head 45 forming part of the unit 95 is provided with an electromagnet 52 which carries the coils 55 having for instance an inductance of 50 mh., one end of the coils being connected by the conductor 110 to the common electrical ground connection 125 and thereby to the general shielding means 126 of the apparatus, while the other end of the coils is connected by the wire 111 to a switch 120 which can be moved, for the purpose of erasing with direct current, into the position in which it contacts the stationary contact G, and, for the purpose of erasing with high frequency, into the position in which it contacts the stationary contact HF. The latter contact is connected through a condenser 127 e.g. of the electrolytic type to the primary winding 129 of a transformer 128. Before describing in detail the erasing operation it must be stressed that during the erasing operation the amplifier circuit 96 must remain operable in the conventional manner but the erasing current must not affect the reproduction. It can be seen that the condenser 127 blocks the path of the direct current to the primary winding 129 of the transformer 128 so that the amplification of the reproduction cannot be disturbed thereby.

From a junction point between the connection 111 and the switch 120 a connection 108 leads to the output of the recording high frequency generator 93. A series-combination 115 of resistors is connected between the line 108 and a switch 99. The series-combination 115 may have for instance a resistance of 100,000 ohms, and is composed of two separate resistors 116 and 117, the latter having a resistance of approximately 10,000 ohms while the former is a variable resistor. A junction point between the last mentioned resistors 116, 117 is connected through a condenser 118, for instance of the electrolytic type and having a capacity of 2 $\mu$f., to the stationary contact G of a switch 123. It is advisable that the switch arm of the switch 123 is mechanically coupled with the switch arm of the switch 120 so that both switches are always operated conjointly. Both switches are change-over switches having each a stationary contact G and a stationary contact HF. If the switches are moved into the position in which their arms contact the respective contacts G then the condenser 118 is connected to the common ground line 125. In the other position in which their switch arms contact the respective contacts HF the connection from the condenser 118 to the line 125 is interrupted. The contact HF of switch 123 is an idle contact and has no further connections. It will be explained further below that the positioning of the switches 120 and 123 to contact the respective contacts G serves to operate the erasing means by direct current, while in their other position marked HF erasing is carried out by means of high frequency currents.

As far as the condensers 127 and 118 are concerned, it should be noted that the condenser 127, as mentioned above, serves to block the direct current during the erasing operation from entering or disturbing the reproducing amplifier circuit 96, while the condenser 118 is provided for removing pulsating components or ripples of the direct current. Since this last mentioned condenser would not constitute any resistance or impedance for the high frequency current it must be switched off by the switch 123 when the erasing operation is carried out by means of high frequency current.

The already mentioned eraser switch 99 is connected with the one end of the variable resistor 116. The switch arm of switch 99 may be moved into contact with the stationary contact 130 which carries through the connecting line 131 a direct current voltage of about 200 volts positive potential furnished by the tube 134 via the anode connection 103. The above mentioned D.C. value of 200 volt is only an approximate indication and is only given as an example.

The secondary winding 133 of the transformer 128 is connected with the grid of a pentode 134 forming part of the reproducing amplifier circuit 96. This tube 134 is equipped with other control elements which are known and are therefore not described in detail here. Inserted in the cathode connection 135 is a switch 98' which is mechanically coupled with the switch 98 mentioned above and located between the amplifiers 91 and 92 and can be moved between two positions marked A and W. The switch 98' is provided in order to prevent that during recording the high input voltage in the grid-cathode circuit of the tube 134 is rectified. On the other hand, during reproduction it must be avoided to apply the low alternating current voltage between the magnetic head and the grid. Therefore the switch 98' is to be placed in position A during recording and into position W during reproduction.

It does not require any description in what manner the apparatus is started to operate since this is generally known. But it should be mentioned that at the start a record foil or sheet 80 is introduced into the guide slot 37 adjacent to the drum 25 and that this foil 80 may be removed from the drum through the slot 38. Of course, the slot 38 remains closed during the operation of the apparatus in a manner which is well known and by means which are conventional and therefore are not shown in the drawing.

In practice the erasing operation for at least partly removing the magnetization of a certain portion of the record carrier 80 is carried out by using direct current in the following manner:

Assuming that certain signals have been recorded on the record carrier 80 and that the apparatus is switched on, now the switches 98 and 98' are moved into position for reproduction (position W) and the switches 120 and 123 are moved into position for the use of direct current (position G). Now, while the record carrier 80 moves in the direction of the arrow A (FIG. 3) and while the operator is listening to the reproduction of the recorded signals, he will observe aurally when that portion of the record starts to be reproduced which he wants to eliminate. Now the erasing switch 99 is to be operated in such a manner that the arm of the switch contacts the stationary contact 130 whereby the direct current circuit from line 131 is closed through the series-combination 115 of resistors and the coils 55 of the magnet head 52. On account of the above given data now an erasing or demagnetizing current of approximately 2 ma. flows through the coils 55 in view of the existing combined resistance of 100,000 ohms of the resistor series-combination 115. Assuming that the recording current previously used amounted to approximately 3 ma. (peak value) then the above described erasing current will almost completely eliminate the magnetization of the record carrier in the particular portion thereof. However, it has to be borne in mind that under these circumstances the magnet field only in the center of the gap 66 of the sensing member 60 (which field causes the demagnetization thereof) suffices just about for an almost complete demagnetization. On the other hand, in the neighborhood of that corner 67 of the sensing plate 65 which is first met by the moving record carrier 80 (FIG. 3) the magnet field of the record carrier is still strong enough that the operator is able to near the portion of the record which is to be eliminated or extinguished, although only with a substantially reduced volume. Consequently, the operator is in a position of holding the eraser switch in operative position as long as he hears that portion of the record which he wants to eliminate. By adjusting the variable resistor 116 the strength of the erasing current can be varied and can be adjusted for instance to that extent that after the erasing operation the magnetization of the portion of the record carrier which has passed the magnet head 45 is not entirely eliminated and can even be heard once more after reversing the direction of movement of the record carrier and starting reproduction again. After that there are still two alternatives for the procedure: either the cancelled or erased passage remains in the obtained condition of reduced magnetization and the typist who has to type according to the reproduction of the entire record will skip that portion which distinctly reproduces at a substantially lower level of intensity than the remainder of the record. On the other hand, the operator or user of the apparatus may fill in into the erased or partly demagnetized portion of the record new signals or words which then will be recorded at the regular full volume and completely obliterate the remnants of the extinguished record.

Instead of carrying out the erasing procedure by means of the application of direct current, this may also be carried out by means of a high frequency current. In this case the arm of the eraser switch 99 would be moved into engagement with the stationary contact 132 so that the voltage furnished by the second high frequency generator 102, the frequency whereof may be between 20 to 25 kilocycles, is applied to the coils 55 of the magnet head 45. For operating in this manner the switches 120 and 123 must be moved to their positions marked HF. Now the high frequency voltage furnished by the high frequency generator 102 is supplied from contact 132 of the switch 99 to the coils 55 of the magnetic head 45. It can be seen that now the connection through the condenser 118 to ground is interrupted by the switch 123 and that by the switch 120 a low-pass filter 121 is placed in circuit with the condenser 127 and the primary winding 129 of the transformer 128 whereby the high frequency voltage is prevented from being applied to the amplifier input. This is due to the fact that the low-pass filter 121 is chosen so that it permits passage of audio-frequencies but blocks the high frequency.

Figure 6:
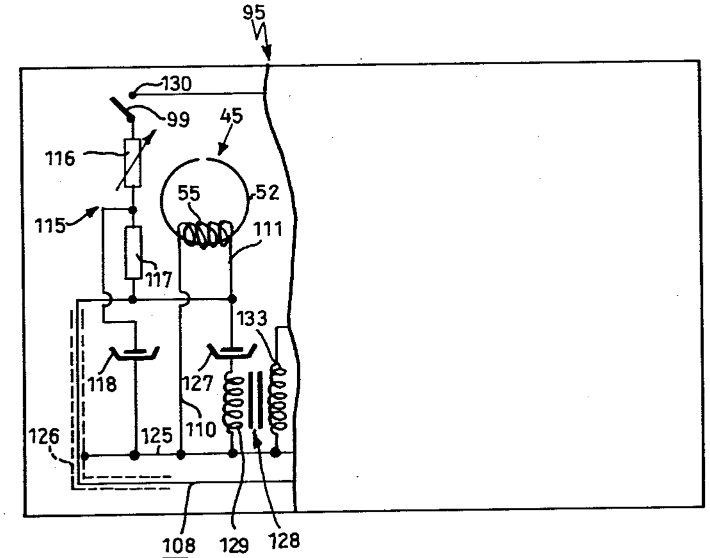
FIG. 6 is a partial wiring diagram showing only those portions of the diagram of FIGURE 5 which are designed for operating the erasing means with direct current only.
Figure 7:
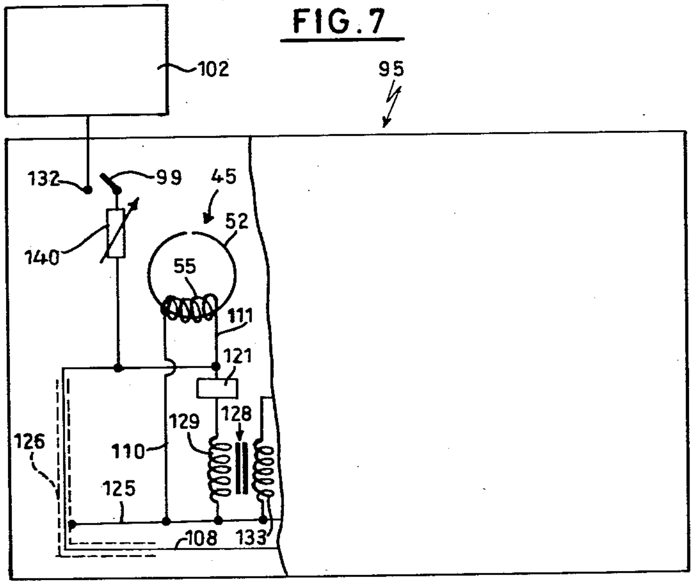
FIG. 7 is a similar partial wiring diagram corresponding to that of FIGURE 5 showing the portions which are adapted for operating the eraser means by high frequency current only.

While in the above example illustrated by FIG. 5 alternatively either direct current or high frequency current could be used for erasing a portion of the record, it will be understood that if only one or the other of these two types of current is to be used, the circuit arrangement can be substantially simplified. This is illustrated by FIGS. 6 and 7 in which all those elements which correspond to those shown in FIG. 5 have the same reference numerals. It will be readily understood that in this case the switch 120 is eliminated because it is no longer required.

Referring now particularly to FIG. 6 which illustrates the alternative in which the erasing operation is carried out only with direct current, only the condenser 127 is connected in series with the primary winding 129 of the transformer 128. On the other hand, referring to FIG. 7 which illustrates the case in which only high frequency is used for erasing, the low-pass filter 121 is connected in series with the primary winding 129. Also, in FIG. 7 the resistor series-combination 115 of FIG. 5 is replaced, by way of example, by one variable resistor 140.

It is evident that in the case of erasing with direct current only (FIG. 6) the switch 123 and the stationary contact 132 of the eraser switch 99 and likewise the second high frequency generator 102 are eliminated because they are no longer needed.

It will be understood that each of the elements described above, or two or more together, may also find a useful application in other types of apparatus for carrying out corrections of records magnetically recorded on a record carrier differing from the types described above.

While the invention has been illustrated and described as embodied in apparatus for carrying out corrections of records produced by one single magnet head on a record carrier and reproduced therefrom by the same head, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for magnetically recording signals on a record carrier and for electromagnetically reproducing the recorded signals therefrom, in combination, an electromagnetic recording and pick-up device including one single magnet and coil means responsive to electrical signals and capable both of causing magnetization of said record carrier in accordance with said signals, and of being influenced by such magnetization of said record carrier in accordance with said signals for reproducing the latter; reproducing amplifier means comprising input transformer means having a primary and a secondary winding, said primary winding being connected in circuit with said coil means; means including a source of high frequency for electromagnetically at least partly removing said magnetization of said record carrier by applying to said coil means a demagnetizing high frequency current from said source of a frequency substantially higher than audio frequency, substantially in that portion of said record carrier by which said electromagnetic recording and pick-up device is being influenced during reproduction of the particular signals; and low-pass filter means connected between said coil means and said primary winding for blocking the passage of said high frequency current from said coil means to said primary winding.

2. In an apparatus for magnetically recording signals on a record carrier and for electromagnetically reproducing the recorded signals therefrom, in combination, an electromagnetic recording and pick-up device including one single magnet and coil means responsive to electrical signals and capable both of causing magnetization of said record carrier in accordance with said signals, and of being influenced by such magnetization of said record carrier in accordance with said signals for reproducing the latter; reproducing amplifier means comprising input transformer means having a primary and a secondary winding, said primary winding being connected in circuit with said coil means; means including a source of high frequency for electromagnetically at least partly removing said magnetization of said record carrier by applying to said coil means a demagnetizing high frequency current from said source of a frequency substantially higher than audio frequency, substantially in that portion of said record carrier by which said electromagnetic recording and pick-up device is being influenced during reproduction of the particular signals; resistor means connected between said source of high frequency current and said coil means for predetermining the degree of removal of said magnetization of said record carrier by the application of said high frequency current; and low-pass filter means connected between said coil means and said primary winding for blocking the passage of said high frequency current from said coil means to said primary winding.

3. In an apparatus for magnetically recording signals on a record carrier and for electromagnetically reproducing the recorded signals therefrom, in combination, an electromagnetic recording and pick-up device including one single magnet and coil means responsive to electrical signals and capable both of causing magnetization of said record carrier in accordance with said signals, and of being influenced by such magnetization of said record carrier in accordance with said signals for reproducing the latter; reproducing amplifier means comprising input transformer means having a primary and a secondary winding, said primary winding being connected in circuit with said coil means; means including a source of high frequency for electromagnetically at least partly removing said magnetization of said record carrier by applying to said coil means a demagnetizing high frequency current from said source of a frequency substantially higher than audio frequency, substantially in that portion of said record carrier by which said electromagnetic recording and pick-up device is being influenced during reproduction of the particular signals; variable resistor means connected between said source of high frequency current and said coil means for arbitrarily predetermining the degree of removal of said magnetization of said record carrier by the application of said high frequency current; and low-pass filter means connected between said coil means and said primary winding for blocking the passage of said high-frequency current from said coil means to said primary winding.

References Cited in the file of this patent

UNITED STATES PATENTS

| | | |
|---|---|---|
| 873,083 | Poulsen et al. | Dec. 10, 1907 |
| 1,886,616 | Alverson | Nov. 8, 1932 |
| 2,327,956 | Begun | Aug. 24, 1943 |
| 2,558,853 | Kappeler | July 3, 1951 |
| 2,610,257 | Wissman | Sept. 9, 1952 |
| 2,682,578 | Claras | June 29, 1954 |
| 2,743,320 | Daniels et al. | Apr. 24, 1956 |
| 2,784,259 | Camras | Mar. 5, 1957 |
| 2,804,499 | Butts | Aug. 27, 1957 |

FOREIGN PATENTS

| | | |
|---|---|---|
| 685,227 | Great Britain | Dec. 31, 1952 |
| 552,290 | Italy | Nov. 30, 1956 |